United States Patent
Chumakov et al.

(10) Patent No.: US 7,441,446 B2
(45) Date of Patent: Oct. 28, 2008

(54) METHOD AND APPARATUS FOR DETERMINING SURFACE CHARACTERISTICS BY USING SPM TECHNIQUES WITH ACOUSTIC EXCITATION AND REAL-TIME DIGITIZING

(75) Inventors: Dmytro Chumakov, Dresden (DE); Holm Geisler, Dresden (DE); Ehrenfried Zschech, Moritzburg (DE)

(73) Assignee: Advanced Micro Devices, Inc., Austin, TX (US)

( * ) Notice: Subject to any disclaimer, the term of this patent is extended or adjusted under 35 U.S.C. 154(b) by 33 days.

(21) Appl. No.: 11/420,325

(22) Filed: May 25, 2008

(65) Prior Publication Data

US 2007/0044544 A1 Mar. 1, 2007

(30) Foreign Application Priority Data

Aug. 31, 2005 (DE) ............... 10 2005 041 301

(51) Int. Cl.
  *G01H 3/12* (2006.01)
(52) U.S. Cl. .......................... 73/105; 73/606
(58) Field of Classification Search ............ 73/105, 73/606
  See application file for complete search history.

(56) References Cited

U.S. PATENT DOCUMENTS

| | | | | |
|---|---|---|---|---|
| 4,603,585 A * | 8/1986 | Atalar | ........................ | 73/606 |
| 5,329,808 A | 7/1994 | Elings et al. | .................. | 73/105 |
| 5,402,681 A * | 4/1995 | Nakaso et al. | ................. | 73/602 |
| 6,305,226 B1 * | 10/2001 | Barber et al. | .................. | 73/606 |
| 6,694,817 B2 * | 2/2004 | Degertekin et al. | ........... | 73/661 |
| 6,838,889 B2 * | 1/2005 | Su et al. | ..................... | 324/750 |
| 7,129,486 B2 * | 10/2006 | Spizig et al. | ................. | 250/311 |
| 2004/0084618 A1 | 5/2004 | Spizig et al. | ................. | 250/306 |
| 2004/0206166 A1 | 10/2004 | Proksch et al. | ................. | 702/94 |

OTHER PUBLICATIONS

Inagaki, K. et al. Waveguide ultrasonic force microscopy at 60 MHz, Appl. Phys. Lett., vol. 76, No. 14, Apr. 2000, pp. 1836-1838.*
Rabe, U. Nanomechanical surface characterization by atomic force acoustic microscopy, J. Vac. Sci. Technol. B, vol. 15, No. 4, Aug. 1997, pp. 1506-1511.*
R. Hillenbrand, et al., "Higher-harmonics generation in tapping-mode atomic-force microscopy: Insights into the tip-sample interaction" American Institute of Physics 2000.
A. Rosa-Zeiser, et al. "The simultaneous measurement of elastic, electrostatic and adhesive properties by scanning force microscopy: pulsed-force mode operation" Meas. Sci. Technol. 8 (1997).

* cited by examiner

*Primary Examiner*—Michael Cygan
(74) *Attorney, Agent, or Firm*—Williams, Morgan & Amerson, P.C.

(57) ABSTRACT

By digitizing the UFM signal without using a lock-in amplifier, substantially all of the information initially contained in the UFM output signal may be maintained and may then be used for further data processing. Consequently, any type of model or evaluation algorithm may be used without being restricted to a very narrow bandwidth, as is the case in lock-in based techniques. The digitizing is performed on a real-time basis, wherein a complete UFM curve is digitized and stored for each scan position. In this way, quantitative meaningful values for specific surface-related characteristics with a nanometer resolution may be obtained.

20 Claims, 4 Drawing Sheets

METHOD AND APPARATUS FOR DETERMINING SURFACE CHARACTERISTICS BY USING SPM TECHNIQUES WITH ACOUSTIC EXCITATION AND REAL-TIME DIGITIZING

BACKGROUND OF THE INVENTION

1. Field of the Invention

Generally, the present invention relates to metrology in the manufacturing of microstructures, such as integrated circuits, and, more particularly, to the measurement of the surface characteristics of microstructure features by means of SPM (scanning probe microscopy) metrology tools with modulated surface excitation, which allow the determination of surface and near-surface characteristics with nanometer resolution.

2. Description of the Related Art

In manufacturing microstructures, such as integrated circuits, micromechanical devices, opto-electronic components and the like, device features such as circuit elements are typically formed on an appropriate substrate by patterning the surface portions of one or more material layers previously formed on the substrate. Since the dimensions, i.e., the length, width and height of individual features, are steadily decreasing in order to enhance performance and improve cost-effectiveness, these dimensions have to be maintained within tightly set tolerances in order to guarantee the required functionality of the complete device. Usually, a large number of process steps have to be carried out for completing a microstructure, and, thus, the dimensions of the features during the various manufacturing stages have to be thoroughly monitored to maintain process control and to avoid further cost-intensive process steps owing to process tools that fail to meet the specifications in an early manufacturing stage.

For example, in highly sophisticated CMOS devices, the gate electrode, which may be considered as a polysilicon line formed on a thin gate insulation layer, is an extremely critical feature of a field effect transistor and significantly influences the characteristics thereof. Consequently, the size and shape of the gate electrode has to be precisely controlled to provide the required transistor properties. Thus, great efforts are being made to steadily monitor the dimensions of the gate electrode.

However, for highly scaled microstructures, the surface characteristics of the materials used increasingly become important aspects for enhancing performance and reliability of the devices and/or for reducing yield loss and the like. For example, the detection of grain sizes, micro-cracks, adhesion characteristics and elastic properties may be important for the performance and reliability of the devices, especially when highly scaled microstructure devices are considered. By way of example, in metallization layers of advanced integrated circuits, the adhesion characteristics may significantly affect the mechanical strength during the manufacturing process and may also determine the reliability of the finished device while the crystallinity of the metal also influences the current drive capability and thus the performance of the device. Moreover, the formation of well-understood interfaces between two different materials is an important aspect and may therefore require reliable measurement data of surface characteristics.

Consequently, there was a growing need for techniques which may be able to characterize materials and in particular their engineered surfaces with a spatial resolution that is appropriate for highly scaled microstructures, such as integrated circuits. A frequently used and very powerful tool in this respect is the atomic force microscope (AFM) which allows the characterization of nano-structured materials by scanning an appropriate tip of a cantilever across a sample surface. During the scan operation, typically the charge cloud of the tip interacts with respective charge clouds of the sample surface, wherein the corresponding interaction, i.e., the minimal displacements of the tip, are recorded to obtain information on the surface structure with a nanometer resolution. Thus, atomic force microscopy provides a three-dimensional image of the surface topography, which may provide precious information with respect to the surface structure of the sample. However, when imaging a sample surface with high spatial resolution, respective surface portions within an area of a few micrometers or smaller may appear almost atomically flat so that the corresponding image obtained by means of the atomic force microscope includes less contrast and thus may not allow the extraction of detailed information on surface characteristics at this high resolution, although, on a broader scale, a significant sample topography may be present.

Therefore, recently, a new technique has been developed, in which image contrast and thus extraction of details of small areas of interest may be efficiently enhanced by exciting the sample surface with sound waves, wherein ultrasonic sound with frequencies up to several MHz may be used. A corresponding excitation of the sample surface is typically used in combination with an atomic force microscope and this technique is typically referred to as ultrasonic force microscopy (UFM). Using this technique, the tip of the atomic force microscope is used to detect the acoustic or ultrasonic waves via the sample surface, wherein elastic changes of the surface below the tip permits extraction of detailed information on the elastic properties of the sample surface with high spatial resolution.

Figure 1:
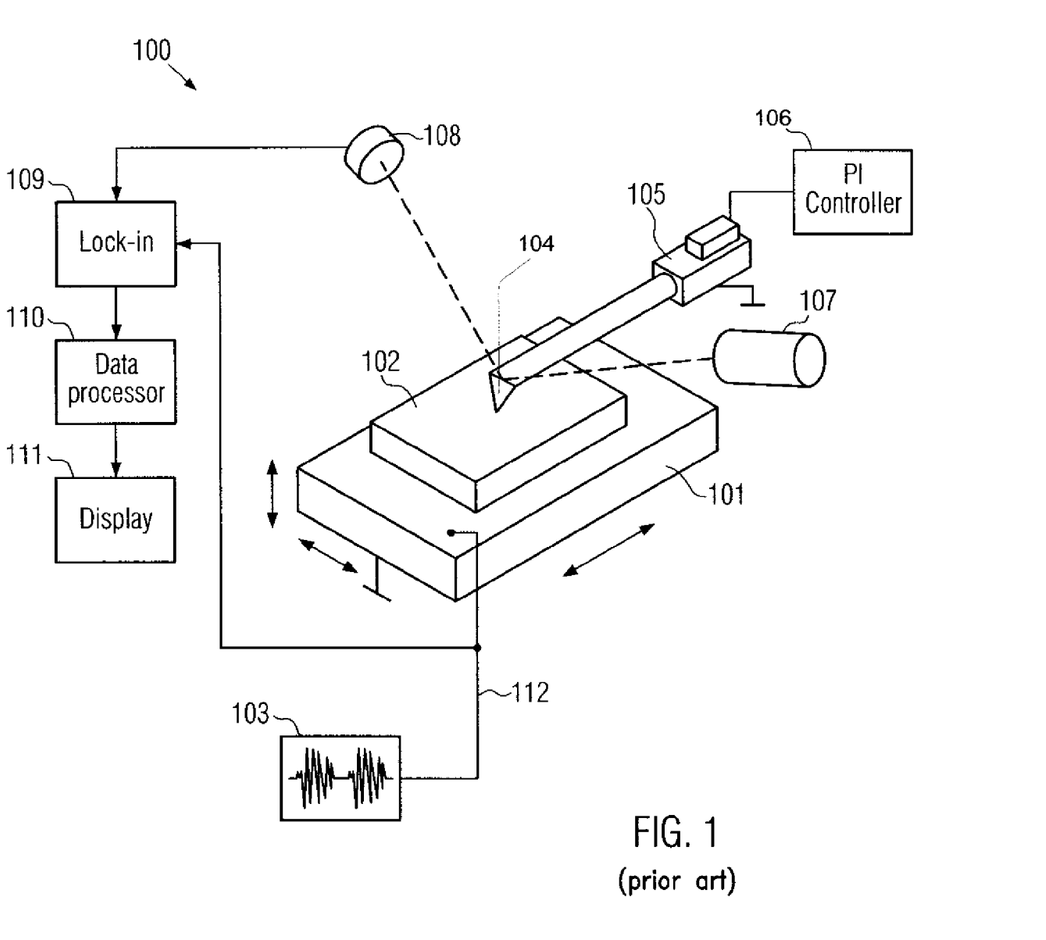
FIG. 1 schematically shows a conventional UFM system, in which a reduced amount of information contained in the original UFM signal is used for extracting information.

With reference to FIG. 1, a typical conventional metrology tool will now be described to explain the basic principle of UFM for the investigation of sample surfaces, such as layer surfaces as used during the fabrication of microstructural features. In FIG. 1, a system 100 comprises a sample holder 101, which may be provided to include a piezoelectric material that is connected to a modulation unit 103 which may provide modulated signals to the sample holder 101 so as to exert vibrational excitation and thus a surface excitation to a sample 102 placed on the substrate holder 101. The substrate holder 101 may further be configured to allow a scan operation in at least two dimensions, which may be substantially perpendicular to the surface portion of the sample 102 to be examined. The system 100 further comprises a tip 104 as a scanning probe, which may interact with the surface of the sample 102. The tip 104 may be attached to a corresponding cantilever, which in turn is supported by a cantilever holder 105, which may also comprise an appropriately configured piezo crystal that may be controlled by a specific PI (proportional integral) controller 106. Thus, the tip 104 may be biased by the cantilever holder 105 so as to adjust the force with which the tip 104 contacts or interacts with the sample 102. In other configurations of microscopes of the scanning probe type, the tip 104 and the corresponding cantilever holder 105 may be configured to provide the scan functionality. That is, the tip 104 is scanned across the sample 102, while the sample 102 may remain fixed. Moreover, a laser 107 may be positioned such that the output beam thereof impinges on the cantilever and is reflected therefrom so as to be detected by a corresponding optical detector 108, so that the output signal of the detector 108 is a measure for the displacement of the tip 104. The detector 108 is connected to lock-in amplifier 109, which is also connected to the modulation unit 103, thereby enabling one to tune the lock-in amplifier 109 to a specified frequency component with the intention to reduce signal noise and to facilitate information extraction from the output signal of the detector 108. Moreover, a data processor 110 may be provided to manipulate the data obtained from the lock-in amplifier 109, which may then be displayed or otherwise provided in a display unit 111.

During the operation of the system 100, the sample 102 is positioned on the substrate holder 101 and is scanned in one or two dimensions, while the displacement of tip 104, biased with a specific force as controlled by the PI controller 106, is detected by the detector 108, the signal of which is processed by the lock-in amplifier 109. During the measurement procedure, a specific modulation signal 112 is supplied to the substrate holder 101 to excite the sample, and thus the sample surface, with a specified signal containing frequencies up to several MHz, wherein these frequencies may be modulated with a corresponding carrier wave, such as a sawtooth wave and the like. During the scan operation, the output signal of the detector 108 is picked up by the lock-in amplifier 109, which is tuned to the modulation frequency, thereby obtaining information on the power of a modulation frequency component in the signal spectrum provided by the detector 108. This signal may further be used by the data processor 110 to provide an image, that is, a qualitative mapping of the UFM response to exciting the sample 102, with a high spatial resolution compared to pure AFM techniques. Consequently, surface characteristics, such as crystallinity, elastic properties and the like, may be qualitatively investigated and monitored with high spatial resolution.

It appears, however, that for a quantitative determination of specific nanomechanical properties, such as highly precise values of elastic properties of surface portions, the conventional UFM system 100 may suffer from a plurality of problems. For instance, the UFM signal may be strongly modified by signal artifacts, which may originate from the PI controller 106 that provides the bias force of the tip 104 during the scan operation. Since the lock-in amplifier 109 is tuned to the modulation frequency, such substantially DC or low frequency interferences may not be identified by the data processor 110, thereby resulting in highly unreliable measurement data. Moreover, the data processor 110 receives information about the power of a modulation frequency component but does not receive any information about the waveform of the signal itself. Consequently, in sophisticated applications, a precise and reliable determination of surface-related characteristics may be difficult with conventional systems, even if a conventional UFM tool is capable of providing a high spatial resolution.

In view of the above-described situation, a need exists for an enhanced technique that avoids or at least reduces one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a technique that enables the extraction of information obtained from scanning probe microscope type tools ("SPM-type tools") operated on the basis of a modulated sample excitation in a more reliable and more complete fashion by using the waveform of the signal as obtained from the SPM tool substantially without data reduction, which may include precious information that is conventionally lost by the pre-processing by means of a lock-in amplifier in a conventional UFM regime. Thus, a more complete data set is created so as to overcome information limits about the nanomechanical properties of the materials based on SPM-type measurements combined with modulation, such as acoustic or ultrasonic modulation. Consequently, the technique according to the present invention is highly advantageous in quantifying nanomechanical properties of microstructures, such as surface characteristics in advanced integrated circuits.

According to one illustrative embodiment of the present invention, a metrology system comprises a scanning probe microscope and a modulation unit connected to the scanning probe microscope to enable a modulated excitation of a sample. Moreover, the metrology system comprises a signal processing unit connected to the scanning probe microscope to receive an output signal therefrom for a plurality of scan positions, wherein the signal processing unit is configured to digitize and record a plurality of frequency components for each scan position. In one illustrative embodiment, the signal processing unit is configured to digitize and record the substantially complete output signal as received, that is, the complete waveform in the time domain is digitized and recorded.

According to another illustrative embodiment of the present invention, a method comprises scanning a sample surface by a scanning probe at at least a plurality of scan positions to obtain a surface-related output signal at each of the plurality of scan positions. Moreover, the sample surface is excited with a modulated signal and the output signal, including a plurality of frequency components, is digitized for each of the plurality of scan positions.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention is directed to a technique that enables the determination of quantitative estimates for a characteristic of surface portions with high spatial resolution in that an increased amount of information is used for the signal processing of an output signal of the SPM tool. For this purpose, in some illustrative embodiments, substantially the full signal obtained from the SPM-like tool may be used, that is, may be digitized and recorded, so as to be available for further data processing, which may be performed on the basis of any appropriate model at any convenient time. The signal may be digitized and recorded substantially in real time so that, for each specified scan position, a complete or substantially complete record of information regarding these specific scan positions is obtained. Based on this measurement data, which may contain a significantly increased amount of information compared to conventional systems that are related to a single frequency component for each scan position due to the application of a lock-in technique, a more efficient data evaluation may be performed on the basis of one or more appropriate analysis algorithms so as to create meaningful quantitative values for a material characteristic of interest. Moreover, since the measurement data recorded for each scan position may also include any DC and low frequency "interferences," corresponding signal artifacts that may remain undetected in the conventional technique, may be identified and compensated for by appropriately selected mechanisms.

Figure 2A:
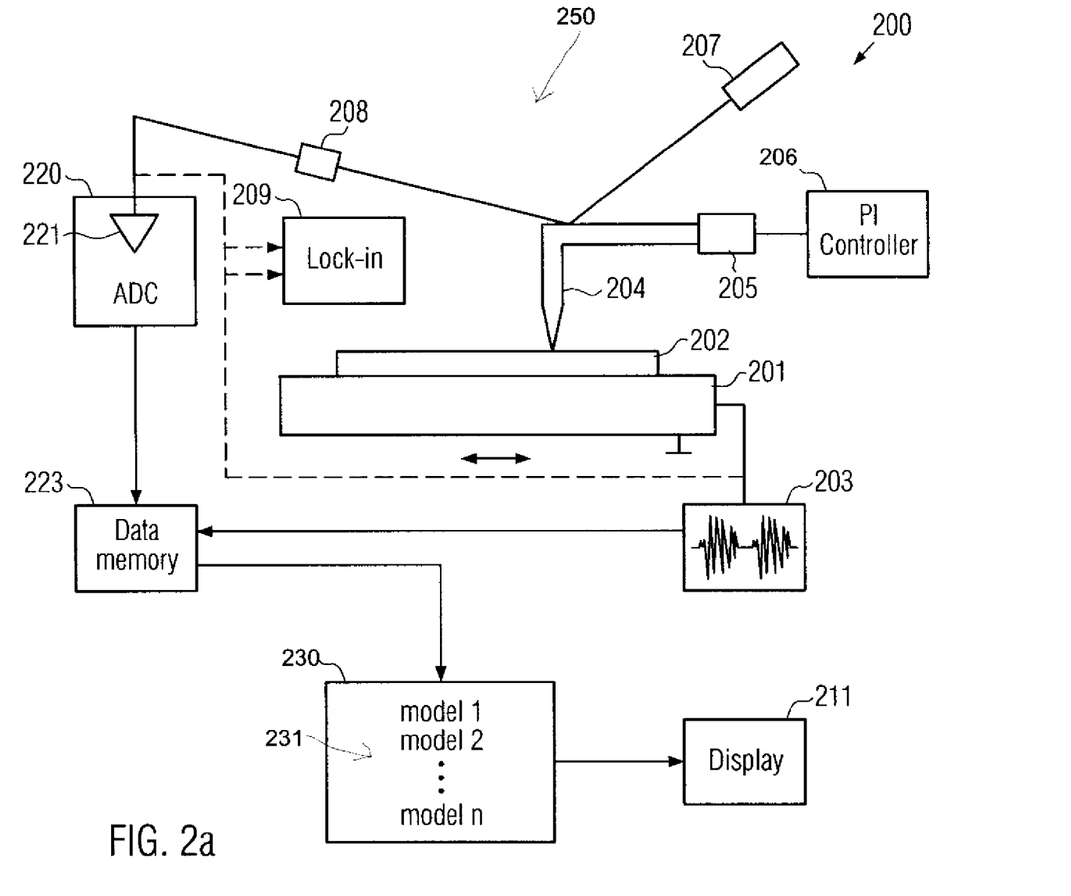
FIG. 2a schematically shows an SPM-type system in which an increased amount of information may be used for data processing in accordance with illustrated embodiments of the present invention.

With reference to FIGS. 2a-2c and 3, further illustrative embodiments of the present invention will now be described in more detail. FIG. 2a schematically shows a metrology system 200 comprising an SPM-type tool 250, i.e., a tool in which a sample and/or a probe are moved relative to each other to scan a specified portion of the sample surface. The SPM-type tool may comprise, in one illustrative embodiment, an AFM tool. The scanning probe microscope 250 may comprise a substrate holder 201, which may also provide the functionality of a scanning tool so as to controllably move a sample 202 in at least two different directions. In other embodiments, the scan functionality of the scanning probe microscope 250 may be provided by a probe or tip 204 for interacting with the surface of the sample 202, wherein the tip 204 is supported by a corresponding cantilever and attached thereto a cantilever holder 205, which in turn is connected to a PI controller 206 configured to control the holder 205 so as to provide a bias force to the tip 204. In some embodiments, the holder 205 and the controller 206 may be configured to move the tip 204 across the sample 202 in order to operate as a scanner. Furthermore, the scanning probe microscope 250 comprises appropriate means for detecting the deviation of the tip 204 in response to an interaction with the sample 202, wherein, in illustrative embodiments, a laser 207 and a corresponding optical detector 208 may be provided for detecting the displacement of the tip 204 and for generating a corresponding output signal for each of a plurality of scan positions.

The metrology tool 200 may further comprise a modulation unit 203, which may be configured so as to at least excite a surface of the sample 202 in a modulated manner, for instance by mechanically exciting the substrate holder 201, as is described with reference to FIG. 1. In some illustrative embodiments, the modulation unit 203 comprises an acoustic modulation unit configured to provide a modulated signal to the substrate holder 201 and thus to the sample 202, wherein the modulated signal may include frequency components ranging from several KHz to several MHz and higher. It should be appreciated that acoustic modulation is to be considered as comprising frequencies up to several KHz, whereas an ultrasonic modulation is to be understood to include frequencies up to several or several hundreds of MHz. The frequency component or components provided for exciting the sample surface may be modulated according to any desired waveform, such as a sawtooth wave, a sinusoidal wave and the like. In other illustrative embodiments, the modulation unit 203 may comprise, additionally or alternatively to providing an electric modulated signal to a piezoelectric element in the substrate holder 201, other means for exciting the sample 202 or at least the surface thereof. For example, the modulation unit 203 may comprise a radiation source configured to direct a beam of radiation to the sample 202 to provide a modulated excitation of the sample 202.

In some embodiments, a pulsed laser source may be provided, which may introduce energy into specific portions of the sample 202 in a modulated fashion, that is, in a pulsed fashion. In still other embodiments, the controller 206 and the holder 205, in combination with the tip 204, may be configured to receive the modulated signal from the modulation unit 203 and to excite the sample surface by means of the tip 204.

The metrology system 200 may further comprise a signal processing unit 220 that is configured to receive the output signal of the detector 208 and to provide a digitized value of the output signal for each scan position, thereby providing "real-time" digitizing of the output signal of the detector 208. It should be appreciated that the term "real-time" in this respect is to be understood such that the signal processing unit 220 is capable of at least digitizing a plurality of frequency components for a given scan position such that the original waveform of the output signal is represented by the plurality of frequency components to facilitate a quantitative estimation with a desired precision. For example, digital oscilloscopes provide a sufficiently high sampling rate so as to detect frequency components up to several tenths of MHz, wherein a possible signal distortion due to the limited bandwidth of the oscilloscope may be tolerable with respect to a subsequent data processing on the basis of digitized data sets for each of the plurality of scan positions that are distorted or restricted due to the limited bandwidth. Thus, the term "a plurality of frequency components" is to be understood such that at least a bandwidth is covered that allows estimation of the "true" or original waveform in this frequency band. Moreover, "real-time" processing in this respect is to be understood such that a complete output signal train of the detector 208 is digitized for a specific scan position prior to digitizing a subsequent signal train for a further scan position. In one illustrative embodiment, the signal processing unit 220 is configured to receive the output signal containing the "full" information, except for any signal distortions caused by a restricted bandwidth of the communication path and the input of the signal processing unit 220, as a signal represented in the time domain, wherein the complete waveform is digitized and recorded, thereby maintaining the full amount of information in said output signal. The signal processing unit 220 may comprise an input amplifier 220, which may have, contrary to any extreme frequency selective amplifiers used in conventional SPM systems, a sufficient substantially linear gain characteristic so as to not unduly distort the output signal, at least within a specified frequency range. In some illustrative embodiments, the signal process unit 220 is configured to process DC and low frequency components that may be contained in the output signal of the detector 208. Hence, the input amplifier 221, if provided, may be configured to also amplify respective DC and low frequency components.

The system 200 may further comprise a data memory 223 connected to the signal processing unit 220 in order to store the digitized data received from the signal processing unit 220 as respective output data, wherein the data memory 223 is configured to maintain the spatial correlation of the output data and a respective scan position. Moreover, in some illustrative embodiments, the data memory 223 may also be connected to the modulation unit 203 and may be configured to store the output data in a correlated manner with respect to the modulation frequency used in the modulation unit 203. In some illustrative embodiments, the system 200 may further comprise a lock-in amplifier 209 that may be connected for receiving the output signal from the detector 208 substantially without generating any signal distortion for the input signal of the signal processing unit 220. The lock-in amplifier 209 may be tuned to the modulation frequency of the modulation unit 203, thereby providing real-time data of reduced information contents, which may be advantageous in qualitatively estimating specific sample characteristics. Based on this data of reduced information, a further data manipulation, such as the selection of specific sampling regions, regions of interest and the like, may be performed. Moreover, the metrology system 200 may further comprise a data processor 230 which may have implemented therein one or more evaluation algorithms or models 231 for operating on the output data stored in the data memory 223. In illustrative embodiments, one or more evaluation algorithms 231 may include error compensating mechanisms so as to efficiently identify systematic errors, such as a baseline drift of the controller 206 and the like. Moreover, the metrology system 200 may comprise a data indicator 211 in the form of a display and the like to present the output data manipulated by the data processor 230 in any appropriate form that enables the quantitative estimation of at least one surface characteristic of the sample 202.

During the operation of the metrology system 200, a modulated surface excitation is created for the sample 202 while it is sampled by the tip 204. The output signal of the detector 208 is then received by the signal processing unit 220, which digitizes, in illustrative embodiments, substantially the full output signal including a plurality of frequency components, which may include any DC and low frequency components. In other embodiments, appropriate filter means (not shown) may be used to restrict the output signal of the detector 208 to an appropriate operating range of the signal processing unit 220, wherein, nevertheless, a moderately large bandwidth is provided to estimate the waveform of the output signal of the detector 208. In some illustrative embodiments, a plurality of analog-to-digital converters may be used with different sample and hold times, thereby providing a different degree of "averaging" of the incoming output signal, wherein, for instance, a digitized data with less resolution may be obtained with low delay and may therefore be subjected to a real-time data processing to allow immediate qualitative evaluation of the incoming output signal for each of the plurality of scan positions.

The digitized data provided by the signal processing unit 220, which represent the output signal 208 for each scan position at least within a moderately broad bandwidth, are then stored in the data memory 223 in such a manner that a correlation between a respective scan position and an output signal of the detector 208 associated therewith is maintained. In some illustrative embodiments, information from the modulation unit 203 may be stored in the data memory to correlate the output data with modulation-specific information, which may enable tuning the corresponding output data with respect to, for instance, the modulation frequency in a subsequent data processing operation. Depending on the computational capability of the data processor 230 during and/or after scanning across the sample surface, the data processor 230 may access the data memory 223 and retrieve corresponding output data that may be manipulated in accordance with one or more of the specific models or algorithms 231 for extracting quantitative estimations of one or more surface characteristics of the sample 202. Due to the fact that the waveforms themselves of the output signal delivered by the detector 208 are sampled and stored in the data memory 223, the full or a significantly increased fraction of the information compared to the conventional lock-in based analysis is available and may be exploited in accordance with any appropriate data manipulation algorithm provided in the data processor 230. For example, any edge recognition techniques may be used to operate on the output data so as to identify surface grain boundaries, at which a significant discrepancy of surface elasticity may occur. Due to the increased amount of information available, a corresponding enhanced "contrast" for a two-dimensional image of the scanned area of the sample 202 may be obtained, thereby significantly enhancing the efficiency of a corresponding evaluation algorithm. In other illustrative embodiments, output data correlated with two or more scan positions, such as spatially adjacent scan positions, may be processed to enhance the statistical relevance and reduce the variance of the corresponding evaluated surface characteristic. In other embodiments, the data processor 230 may be configured to enable the definition of one or more regions of interest, i.e., of a plurality of scan positions or pixels in a corresponding image of the sampled surface, wherein in each of the one or more regions of interest a specific data manipulation is commonly provided. For instance, respective output data belonging to a specific one of the one or more regions of interest may appropriately be averaged so as to reduce statistical fluctuations.

Figure 2B:
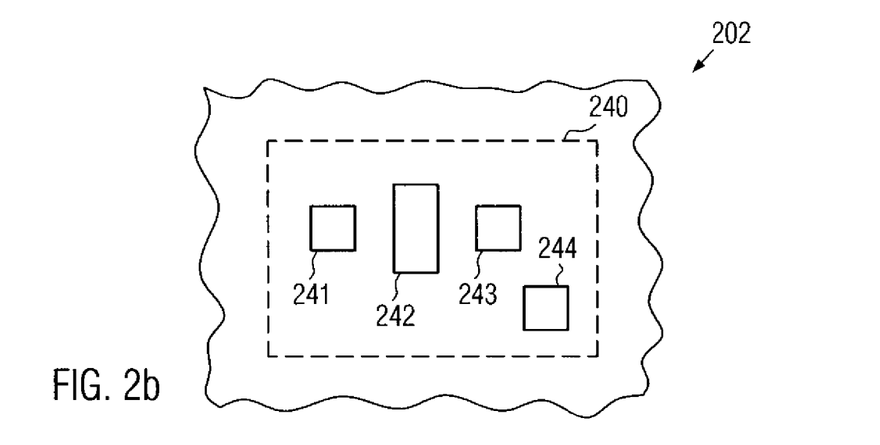
FIG. 2b schematically illustrates a top view of a sample surface with a plurality of regions of interest selected therein.

FIG. 2b schematically shows a top view of a portion of the sample 202, wherein a scan area 240 may be sampled by the tip 204 to create a corresponding output data set including information on the elastic properties of the scan area 240 with high spatial resolution. Based on the output data set representing the scan area 240, in some embodiments, one or more regions of interest 241, 242, 243 and 244 may be selected, in which a corresponding averaging of output data may be performed or any other data manipulation may be performed with increased statistical significance. It should be appreciated that the regions of interest 241, 242, 243, 244 represent a data structure with respect to the output data and may not necessarily have a corresponding representation in the actual scan area 240, as is, for convenience, indicated in the schematic illustration of FIG. 2b. That is, a region of interest may not necessarily be selected on the basis of the spatial neighborhood of scan positions, i.e., pixels in an image of the scan area generated from the output data, but may also be selected on the basis of other criteria, which may combine scan positions at very different positions within the scan area 240. For example, all scan positions having the same value for a specified criterion, such as the DC component in the corresponding UFM signal, may represent a region of interest.

Figure 2C:
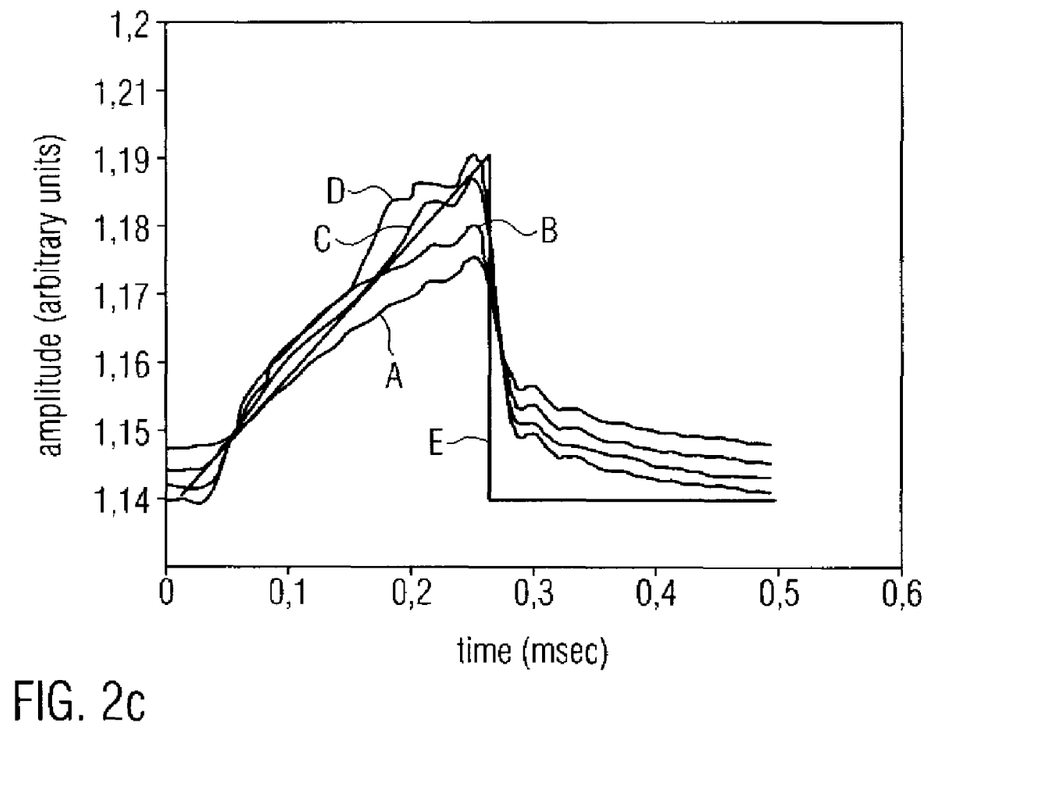
FIG. 2c schematically depicts output signals for various regions of interest of a sample that is examined by an SPM-type tool according to illustrative embodiments of the present invention.

FIG. 2c schematically shows output data representing the amplitudes of output signals for the plurality of regions of interest 241, 242, 243, 244, wherein the corresponding output data have been averaged within each of the respective regions of interest. That is, corresponding sets of output data for all scan positions forming a respective one of the regions of interest 241, 242, 243, 244 are summed and possibly weighted to thereby obtain a single data set and thus UFM curve for each region of interest. In FIG. 2c, curves A, B, C and D may represent the averaged output signals for the regions of interest 241, 242, 243, 244, respectively, while curve E may represent the modulation wave, with which acoustic or ultrasonic operational excitations have been generated in the sample 202. As may be evident from FIG. 2c, different "base line" values at the beginning of the modulation signal indicate a force jump during the scan operation, thereby indicating a signal distortion or shift generated by the controller 206. Consequently, a corresponding drift of the controller 206 may be compensated for during the evaluation of one or more specific surface characteristics of the sample 202. A corresponding "DC drift" generated by the controller 206 may, in conventional techniques using a lock-in amplifier, be very difficult to be detected or may even not be identified at all. Moreover, as indicated above, the output data may be manipulated or compared with each other according to any specific criterion, since substantially no information is lost compared to conventional techniques, thereby providing the possibility for quantitatively estimating surface characteristics with nanometer resolution.

Figure 3:
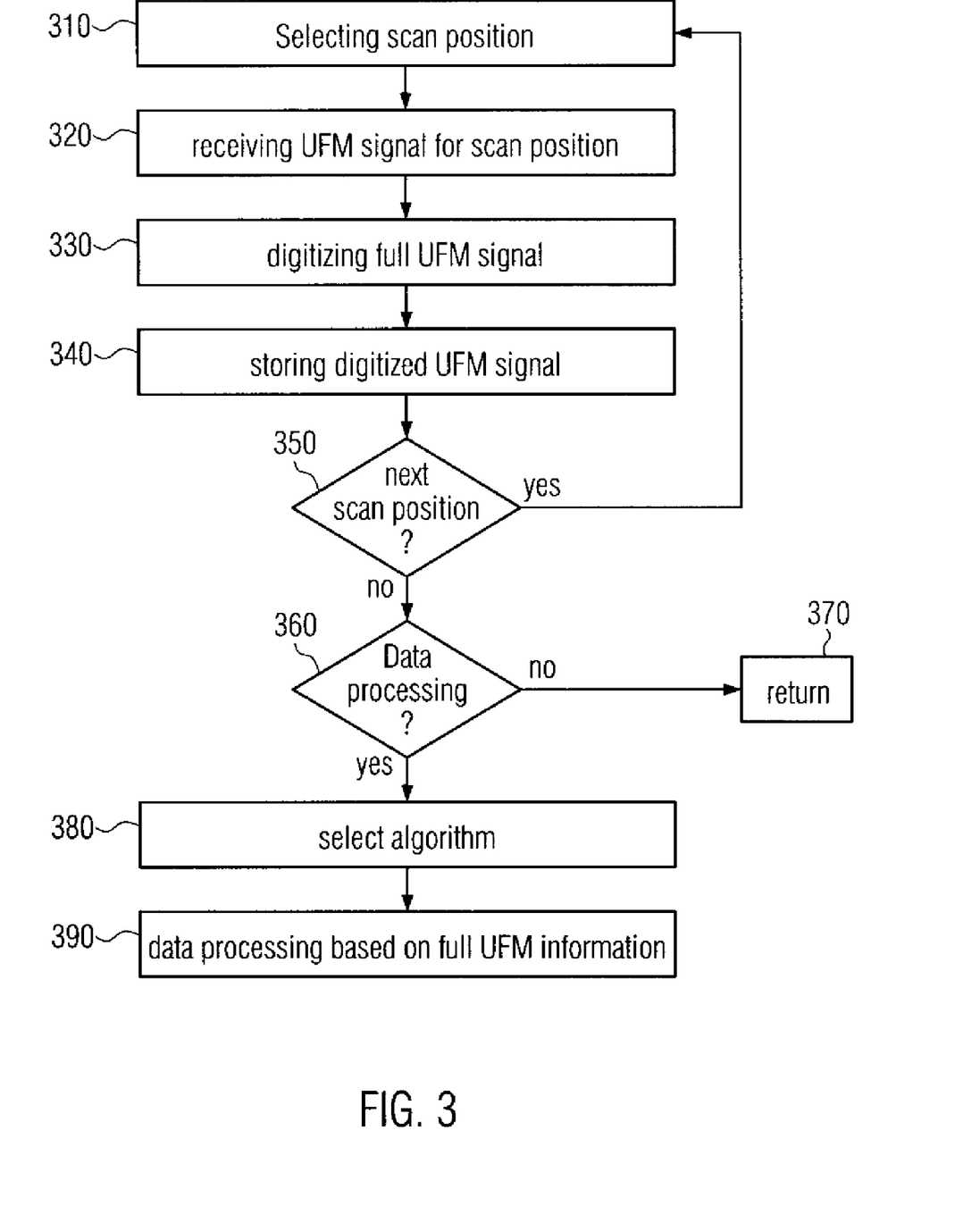
FIG. 3 depicts a flowchart that illustrates an exemplary operation of an SPM-type tool on the basis of modulated excitation in accordance with illustrative embodiments of the present invention.

FIG. 3 depicts a flowchart representing a typical process flow according to illustrative embodiments of the present invention. According to box 310, a scan position is selected by appropriately positioning the sample surface with respect to the scanning probe, such as the tip 204, while the sample surface is excited by an appropriate modulated signal, such as an amplitude modulated high frequency vibrational excitation signal, an optical signal, any other radiative signal, such as microwave radiation, and the like.

According to box 320, the response of the sample surface is detected by the scanning probe and is converted into a respective output signal, for instance by optical means, such as the laser 207 and the detector 208, or any other appropriate means, wherein the output signal is received for a selected scan position.

According to box 330, the output signal is digitized, wherein substantially the full output signal is used so as to suppress any information loss in the subsequent signal processing sequence. Moreover, the process of digitizing the output signal is performed in a "realtime" fashion, that is, the correlation between the output signal digitized and the selected scan position is maintained.

According to box 340, the digitized output data are stored and thus are available for a further signal processing at any later stage, irrespective of the capability of a data processor or any evaluation model or algorithm. Since substantially the full information is available in the stored output data, any iterative or cross-related evaluation techniques may be used, in which, for example, the evaluation result in one model may be used for appropriately selecting further evaluation criteria and performing a corresponding data analysis based thereon.

In box 350, it is decided whether or not a new scan position is to be selected. If the scan area is not yet completely scanned, the process flow returns to box 310 and repeats the steps 320, 330 and 340 to store a further output data set associated with the new scan position. If all desired scan positions are processed, the process flow may advance to box 360, in which it is decided whether a data processing may be performed on the stored digitized output data. Due to the availability of substantially a full information content of the originally detected output signal, very powerful techniques, such as imaging processing techniques, may be used, wherein even external data processors may be used. Thus, if a data processing is not intended at this stage due to non-availability of external resources and the like, the process flow may advance to step 370. If a data processing is desired, in step 380, a desired model or algorithm may be selected and, according to step 390, the data processing may be performed on the basis of the selected algorithm and on the basis of some or all of the output data stored.

As a result, the present invention provides an enhanced technique for the investigation of material characteristics on a nanometer scale, wherein particularly surface-related characteristics may be detected such that quantitative and meaningful values may be determined by using a high amount of information provided by an SPM-type tool operating on an excited sample surface. This is achieved by digitizing the output signal prior to significantly reducing the output signal, as is the case in conventional lock-in techniques, where the data evaluation is reduced to only one given frequency component. Consequently, any type of evaluation algorithm or model may be used for operating on the digitized output data, wherein even complex and powerful algorithms may be used substantially without any restriction with respect to a narrow bandwidth of the output data. In this way, certain characteristics of the measurement process or of the sample may be directly visualized, such as a change of the bias power of the scanning probe. Hence, measurement values that quantify certain surface-related material characteristics may be compared and thus used for classifying these characteristics with high accuracy, thereby providing the possibility to enhance materials and processes for the fabrication of microstructures, such as integrated circuits.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A metrology system, comprising:
a scanning probe microscope;
a modulation unit connected to the scanning probe microscope to enable a modulated excitation of a sample;
a signal processing unit connected to said scanning probe microscope to receive an output signal of said scanning probe for a plurality of scan positions defining a two-dimensional region said signal processing unit being configured to digitize and record a frequency spectrum including a plurality of frequency components of a frequency band for each scan position; and
a data processor operable to generate an image of the sample over the two-dimensional region based on the plurality of frequency components of the frequency band.

2. The metrology system of claim 1, wherein said modulation unit comprises an acoustic modulation unit.

3. The metrology system of claim 2, wherein said acoustic modulation unit is configured to operate at ultrasonic frequencies.

4. The metrology system of claim 1, wherein said scanning probe microscope comprises an atomic force microscope.

5. The metrology system of claim 1, wherein said signal processing unit is configured to digitize and record a full output signal of said scanning probe microscope for each scan position.

6. The metrology system of claim 1, further comprising a data processor configured to operate on said recorded output data on the basis of one or more predefined evaluation algorithms to extract surface-related information from said recorded output data.

7. The metrology system of claim 6, wherein said data processor is configured to average said output data for a defined number of scan positions.

8. The metrology system of claim 7, further comprising an area selector configured to select a region of interest among said plurality of scan positions, said region of interest comprising said defined number of scan positions.

9. The metrology system of claim 1, further comprising a compensation unit configured to estimate a systematic deviation between recorded output data associated with different scan positions.

10. The metrology system of claim 1, further comprising a lock-in amplifier connected to receive said output signal, said lock-in amplifier being tuned to a modulation frequency used in said modulation unit.

11. A method, comprising:
scanning a sample surface by a scanning probe at least a plurality of scan positions defining a two-dimensional region to obtain a surface-related output signal at each of said plurality of scan positions;
exciting said sample surface with a modulated signal;
digitizing said output signal including a frequency spectrum including a plurality of frequency components of a frequency band for each of said plurality of scan positions; and
generating an image of the sample over the two-dimensional region based on the plurality of frequency components of the frequency band.

12. The method of claim 11, further comprising recording said digitized output signal including said plurality of frequency components for each of said plurality of scan positions to store substantially all information included in said output signal at each scan position as output data.

13. The method of claim 12, further comprising manipulating said output data associated with at least some of the plurality of scan positions to extract at least one surface characteristic of said sample surface.

14. The method of claim 13, further comprising defining at least one region of interest in said sample surface and processing output data associated with scan positions of said region of interest on the basis of a specified algorithm.

15. The method of claim 14, wherein said specified algorithm comprises averaging output data belonging to a respective one of said one or more regions of interest.

16. The method of claim 12, further comprising analyzing said output data with respect to a systematic deviation during scanning said sample surface.

17. The method of claim 12, further comprising defining a specific algorithm for analyzing said output data after evaluating at least some of said recorded output data with respect to one or more specific criteria.

18. The method of claim 11, wherein said sample surface is excited on the basis of a modulated acoustic signal.

19. The method of claim 18, wherein said acoustic signal includes ultrasonic frequencies.

20. The method of claim 11, wherein said sample surface is excited by at least one of mechanical excitation and radiative excitation.

* * * * *